United States Patent [19]

Narang et al.

[11] 4,430,989
[45] Feb. 14, 1984

[54] GAS COOKING RANGE

[76] Inventors: Rajendra K. Narang; Kamlesh Narang, both of 1525 Bonnie Rd., Macedonia, Ohio 44056

[21] Appl. No.: 215,074

[22] Filed: Dec. 10, 1980

[51] Int. Cl.³ .............................................. A21B 1/00
[52] U.S. Cl. .............................. 126/273 R; 126/21 A; 126/41 R; 126/215
[58] Field of Search ................... 126/21 A, 15, 41 R, 126/41 A, 41 B, 41 C, 41 D, 41 E, 19 R, 19 M, 21 R, 21 A, 273 R, 273 A, 275 R, 215; 137/99; 219/405, 348; 236/1 G; 431/20

[56] References Cited

U.S. PATENT DOCUMENTS

| 58,398 | 10/1866 | Erving | 126/275 |
|---|---|---|---|
| 1,472,836 | 11/1923 | Hoffman | 126/275 |
| 1,864,715 | 6/1932 | Detwilder | 126/275 |
| 2,488,388 | 11/1949 | Evans | 236/1 G |
| 2,537,082 | 1/1951 | Palmer | 236/1 G |
| 3,298,420 | 1/1967 | Blanzy | 431/191 |
| 3,312,271 | 4/1967 | Beach et al. | 431/191 |
| 3,416,509 | 12/1968 | Huebler et al. | 126/21 A |
| 3,587,557 | 6/1971 | Henderson et al. | 126/21 A |
| 3,612,032 | 10/1971 | Kweller et al. | 126/21 A |
| 3,704,703 | 12/1972 | Takase et al. | 126/39 C |
| 3,835,832 | 9/1974 | Welcker | 126/215 |
| 3,882,767 | 5/1975 | Oyler | 126/21 |
| 3,921,617 | 11/1975 | Rumbaugh | 126/21 R |
| 4,244,979 | 1/1981 | Roderick | 126/21 A |

FOREIGN PATENT DOCUMENTS

| 55-49633 | 4/1980 | Japan | 126/21 A |
| 206931 | 11/1923 | United Kingdom | 126/275 |

OTHER PUBLICATIONS

Crown Custon Built Gas Ranges Brochure.
Modern Maid KU-617 Free Standing Gas Range.
McGraw-Edison Co. Brochure A1-15-050, 8/78.

Primary Examiner—Carroll B. Dority, Jr.
Attorney, Agent, or Firm—Porter & Associates Co.

[57] ABSTRACT

A gas cooking range includes a number of energy-efficient features. The range includes an oven section in which combustion air is preheated by heated discharge gases. Panels are spaced from the walls of the oven and circulation fans are included to provide exceedingly effective airflow within the oven. A gas shutoff valve automatically controls the discharge of heated gases from the oven so that heated gases are discharged only when combustion is occurring. The range also includes a compact, rotatable oven/broiler burner unit, a smoke-free drip pan, an efficient piloted ignition, flame-containing rangetop burner rings atop which pots and pans can be supported, and a small, portable oven which can be supported atop the burner rings.

18 Claims, 12 Drawing Figures

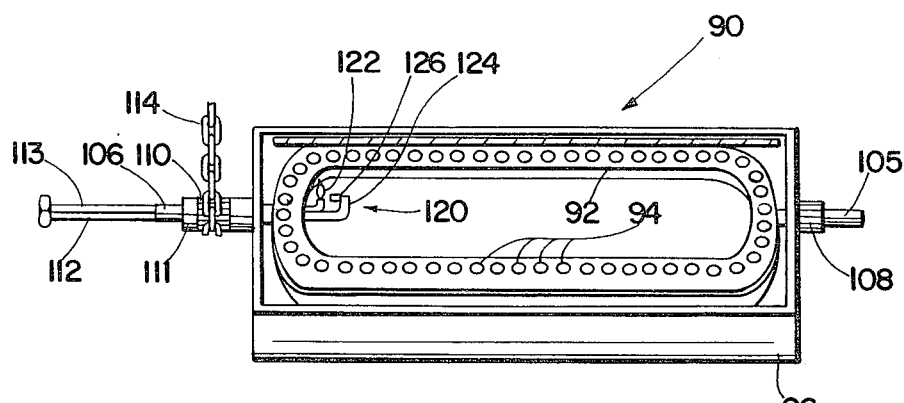
Fig. 5
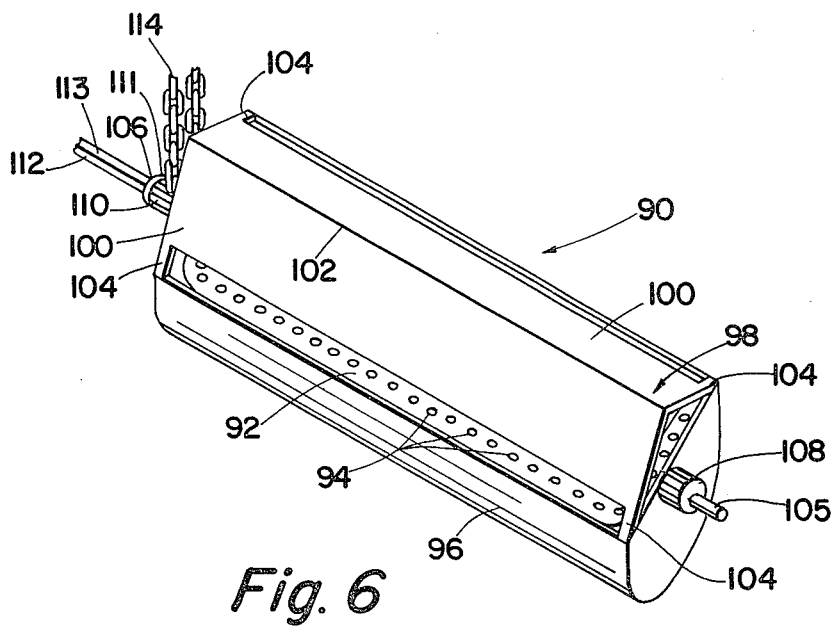
Fig. 6
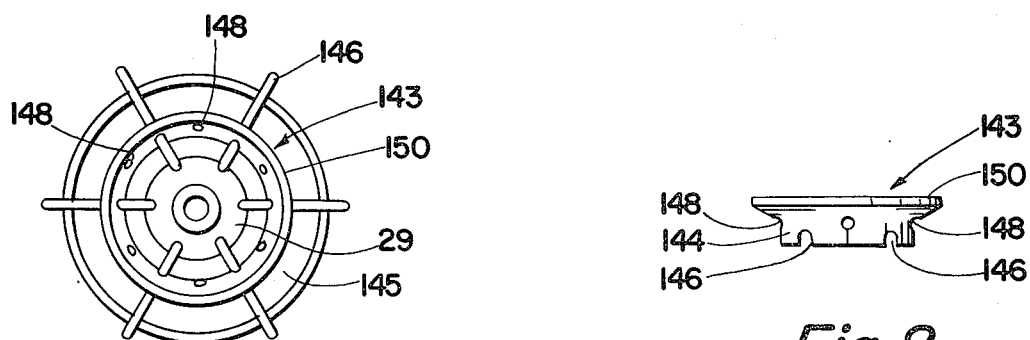
Fig. 7
Fig. 8

GAS COOKING RANGE

BACKGROUND OF THE INVENTION

1. Field of the Invention

The invention relates to gas cooking ranges and, more particularly, to a gas cooking range having improved characteristics of heat circulation, gas discharge, compactness, and, in general, energy efficiency.

2. Description of the Prior Art

Gas cooking ranges have been known for many years and have been provided with a number of features to increase the convenience of cooking foods of various types. Most prior gas ranges constitute a box-type structure with at least one front opening, the other three sides and the bottom and top forming a substantially unitary structure. The front opening typically is provided with at least one oven door and at least one broiler door. A single oven burner usually is provided, with the burner being located at the bottom of the oven compartment and also serving to provide heat for the broiler compartment. A single control knob usually regulates the burner for full power operation for a broiling operation or various lower temperature settings for baking operations in the oven. The air provided for combustion is generally supplied from the bottom of the oven through a number of openings and the products of combustion are vented from the back of the oven, finally discharging into the room in which the oven is contained by being vented through an opening provided near the upper, rear portion of the range. The top of the range typically is provided with a set of four burners, each having its own gas control valve. By this construction, the top burners can be activated in any sequence at any time. Although various other features such as clocks, timers, backguard lights, and so forth can be provided, the basic features of an oven, broiler compartment, and range top burners are common to most gas ranges.

Prior gas ranges, although effective to cook foods in a desired manner, are not entirely satisfactory from an energy efficiency viewpoint. Modifications such as increased insulation and improved door seals have been made in some cases, but practical results have not been very great. The range top burners have a heating efficiency of approximately 45-50%, a very low figure. Oven efficiencies tend to be exceedingly low, on the order of only 5-7%, because of an industry requirement that the average broiler temperature for an enclosed broiler shall reach 530 degrees Fahrenheit above room temperature within 12 minutes and shall reach 530 degrees Fahrenheit above room temperature within 16 minutes for broilers which are heated by oven burners using separate burners located in the oven compartment. In short, a tremendous amount of heat is liberated with a short period of time and the excess heat has no place to go except to heat the inside sheet metal structure, oven racks, and food which may be placed inside the oven, the rest of the heat being inefficiently exhausted through a flue vent.

An industry standard for the temperature of combusting gases at the mouth of the flue vent is a maximum of 480 degrees Fahrenheit above room temperature. This is quite close to the 530 degrees Fahrenheit broiler compartment maximum temperature. Whether the range is used for low temperature oven cooking or high temperature broiling, the inside oven temperature and flue vent temperature are practically the same. In turn, the useful work done by the large oven compartment in terms of heat input and heat output is very, very small. It is inefficient to heat the inside of the oven compartment and not be able to use the high temperature flue vent heat for any useful purpose.

As mentioned previously, certain minor modifications have been made in an attempt to improve the efficiency of gas cooking ranges. These modifications have not been effective and fall far short of the changes needed to effectively utilize available energy. Certain problem areas, such as the inefficiency of the range top burners and the inefficiency of the oven design, have been mentioned already. Other problems which have not been addressed relate to ignition of various burners included as part of the range. So-called pilotless ignition systems have been developed, but although these systems are energy efficient, they lead to corrosion of metal components of the range due to condensation of water on the metal surfaces. Piloted ignition systems small enough to barely drive away moisture have not been effective enough at igniting the burners when desired. A desirable ignition system would provide a small flame just large enough to avoid moisture condensation and, at the same time, would be able to effectively ignite the various burners included with the range.

Another problem not adequately addressed by prior ranges relates to baking small quantities of food. Even if only a small quantity of food needs to be cooked, the entire oven/broiler compartment needs to be heated, an obvious waste of energy. Desirably, a small oven compartment would be provided which would be very energy efficient in the sense that only a small compartment would need to be heated in order to cook a small quantity of food.

Yet another problem which has not been adequately addressed relates to the removal of liquids extracted from food during the cooking process. Prior ranges employ a drip pan which, during the cooking process, becomes heated. When grease or other liquids drip onto the heated pan, smoke and odors are produced which eventually are discharged from the flue vent. A difficult-to-clean film is deposited on surrounding portions of the range. Desirably an improved drip pan system would be provided such that the discharge of smoke and undesirable odors is greatly minimized.

SUMMARY OF THE INVENTION

In accordance with foregoing considerations, the present invention provides a new and improved gas cooking range having a number of energy efficient features. A significant feature of the invention relates to the oven and broiler compartments and how heat is generated, circulated within the compartments, and discharged from the compartments. In order to minimize heat loss when either the broiler compartment or the oven compartment and not the other is being utilized, the invention includes a burner element located near the interface between the oven compartment and the broiler compartment, the burner element including components movable from a first position where heat is directed primarily toward the oven compartment to a second position where heat is directed primarily toward the broiler compartment. The burner element is in the form of a gas-burning manifold having an adjacent flame diverter and reflector. The burner element lies in a generally horizontal plane and the diverter and reflector are rotatable about a longitudinal axis. The diverter and reflector are driven by a gearing arrangement accessible to the operator of the range from a location external of the range.

In order to improve the heating efficiency of the oven, a circulating air system is provided. At least one fan is provided inside the oven, which fan creates a circulating stream of hot air and combustion products to better distribute heat throughout the oven compartment uniformly. If one fan is provided, it desirably is located at the rear of the oven structure and is shielded by a grease-collecting screen. If a second fan is provided, it desirably is placed at the upper portion of the oven and, like the first fan, is shielded by a grease-collecting screen.

In order to further improve air circulation inside the oven compartment, a hot air jacket is provided on three sides and the top of the oven. Hot air is circulated inside the jacket and throughout the oven before finally being discharged through the flue vent. Desirably, the jacket consists of replaceable sheet metal liners which may be easily removed and cleaned. Openings are provided in the liners near racks upon which food containers are placed, the openings permitting heated air to be discharged near the racks in order to heat the food in the shortest possible time and with a significant saving in fuel usage.

The oven door is provided with two door switches, one to cut off power to the electric fans when the door is opened, as a safety feature, and the second to shut off gas to the main burner to eliminate heat loss when the oven door is opened. In sum, the circulating air system results in uniformity in oven temperature, and at the same time reduces heat loss through the walls to the minimum and imparts greater heat transfer to food.

In order to minimize heat loss through the flue vent and improve efficiency of the burner operation, a preheating/gas discharge system is provided. The flue vent employed with the invention is an opening located at the rear of the oven compartment, which opening is covered with a hood to cover almost all sides of the opening. The purpose of the hood is to restrict the free movement of heated gases through the flue opening and thereby maintain the gases inside the oven for a longer period of time. In order to further minimize gas heat loss through the flue vent, a gas-pressure-operated shutoff valve is provided to close the flue vent opening when gas is not being burned by the burner. When a thermostatic control calls for more gas to be burned, the shutoff valve is opened, and gas is permitted to flow to the burner where ignition occurs. Upon attaining the desired oven temperature, the burner will be shut off and the shutoff valve again will close.

In order to further improve oven efficiency, conventional combustion inlet openings are eliminated and a jacket is provided around the flue vent system. Intake air is preheated by being passed through this jacket and is then discharged into the oven/broiler compartments at a location adjacent the burner element.

Heated flue gases also can be discharged to heat a small, eye-level oven compartment provided with independent temperature regulation and its own burner and temperature-regulated exhaust fan. When flue gas temperature is just sufficient for operation of the eye-level oven, the burner and fan are not in operation. When flue gas temperature is insufficient to maintain desired oven temperature, the burner and the exhaust fan are activated. The flue vent system includes a selector plate which directs discharged flue gases either to the eye-level oven or to the atmosphere.

The piloted ignition system employs a two-stage pilot light to ignite burner elements. A first, very small pilot light is employed to drive off moisture and to serve as an igniter for a second pilot light. The second pilot light is larger than the first pilot light and is connected to the first pilot light by a flash tube. The second pilot light receives gas diverted from the gas line supplying a given burner element. When a burner element is to be lighted, gas diverted to the second pilot light will cause the second pilot light to be ignited by the first pilot light. In turn, the now-ignited second pilot light will ignite the burner element. Upon shutting off gas flow to the main burner element, the second pilot light will be extinguished. The first pilot light, however, will continue to burn.

In order to improve the efficiency of range top burners, flame-containing range-top burner rings are provided. The burner rings essentially are annular wall members configured on their lower surface so as to make a substantially fluid tight seal with the surface of the range surrounding the burners. Pots and pans may be placed atop the burner rings, thereby containing the flame and hence the heat emitted by the burners. Suitable openings are provided in the wall members for the admission of combustion air.

A small, portable oven compartment enclosed on all sides and having a front loading and unloading door can be provided to sit atop one or two of the range top burners. The portable oven can be used when it is desired to cook only a small quantity of food at any given time. Use of the portable oven obviously will result in fuel savings, because it will not be necessary to heat the large oven compartment to cook only a small quantity of food. When the portable oven no longer is needed, it can be removed from the top of the burners and stored compactly with pots and pans or other cooking equipment.

In order to minimize the production of smoke and odors resulting from the removal of liquids extracted from food during the cooking process, an improved drip pan system is provided. The drip pan system includes a slanting surface located beneath the broiler compartment. Liquids dripped onto the surface are directed toward a discharge opening located at the lowest point on the slanted surface. A separate tray is located away from the broiler compartment and beneath the opening. The separate tray is maintained at or near room temperature. Accordingly, liquids coming into contact with the slanted surface will drain through the opening into the separate tray and will not have time to be burned. Because the liquids are collected in a tray maintained at low temperatures, smoke and odors are substantially eliminated.

DESCRIPTION OF THE DRAWINGS

FIG. 5 is a side elevational view of an oven/broiler compartment burner element included as part of the invention, a two-stage piloted ignition also being shown;

FIG. 6 is a perspective view of the burner element of FIG. 5;

FIG. 7 is a plan view of a range top burner according to the invention showing a flame-containing burner ring in place;

FIG. 8 is a side elevational view of a burner ring according to the invention;

DESCRIPTION OF THE PREFERRED EMBODIMENT

Figure 1:
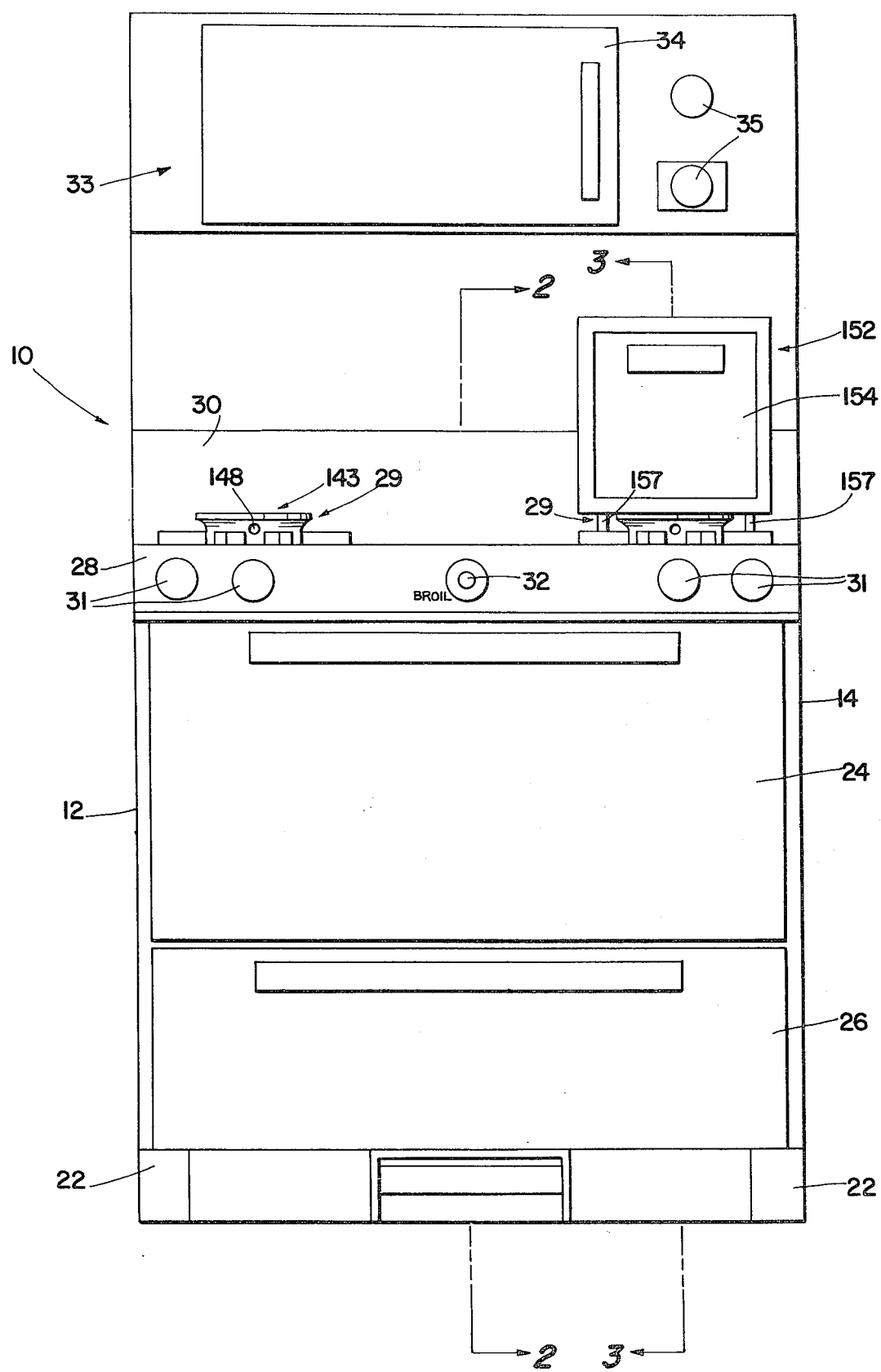
FIG. 1 is a front elevational view of a gas cooking range according to the invention.

Referring to FIGS. 1–4, a gas cooking range 10 according to the invention is shown. The range 10 includes side walls 12, 14, a rear wall 16, a bottom wall 18, an upper wall 20, supporting legs 22, an oven compartment door 24, and a broiler compartment door 26. The range 10 also includes a burner-supporting structure 28, range-top burner elements 29, an upstanding rear panel 30, burner control knobs 31, and an oven/broiler control knob 32. An eye-level oven 33 having a door 34 and control knobs 35 also may be provided. The foregoing elements are well known in the art.

Figure 2:
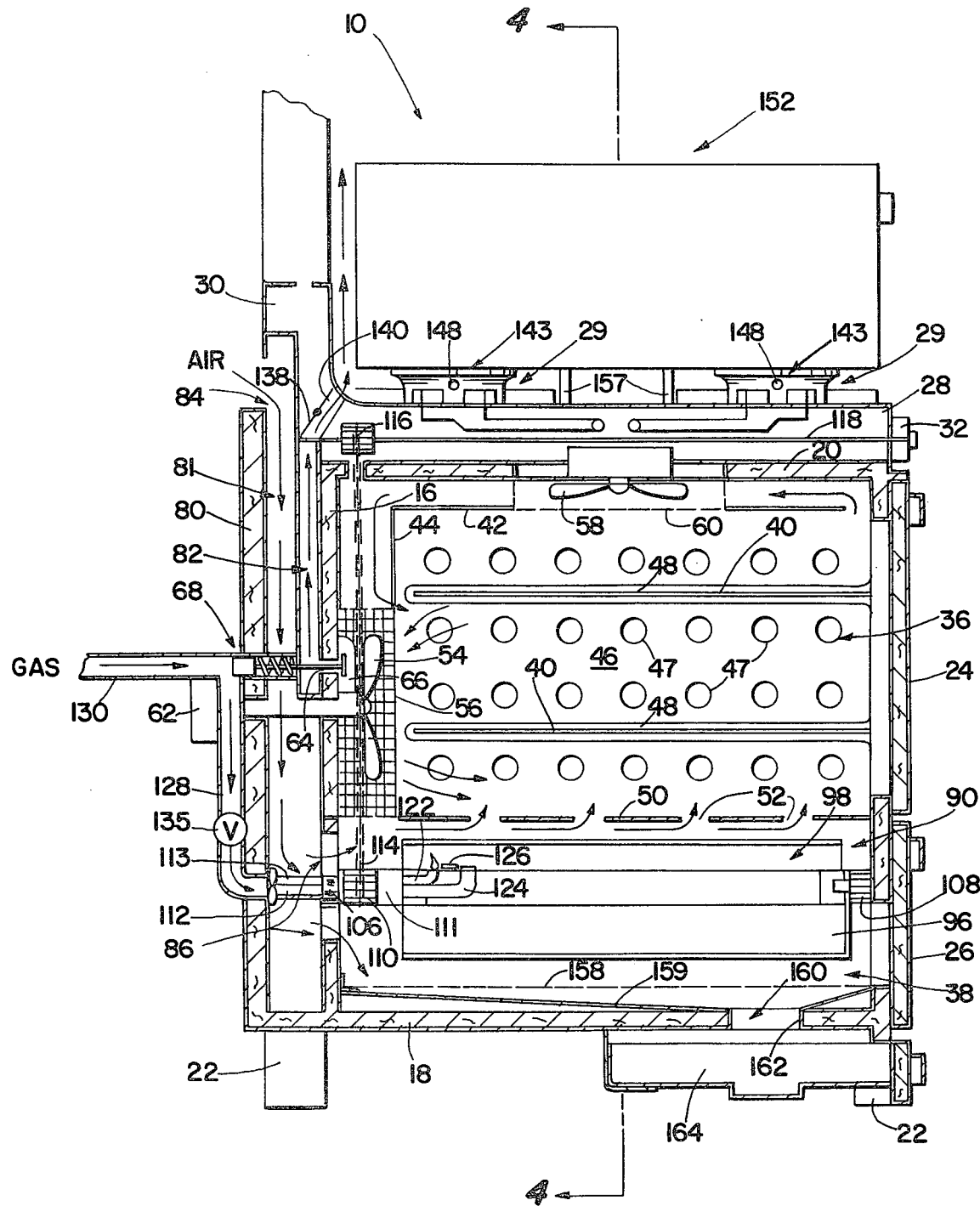
FIG. 2 is a cross-sectional view of the range of FIG. 1 taken along a plane indicated by line 2—2 in FIG. 1.
Figure 3:
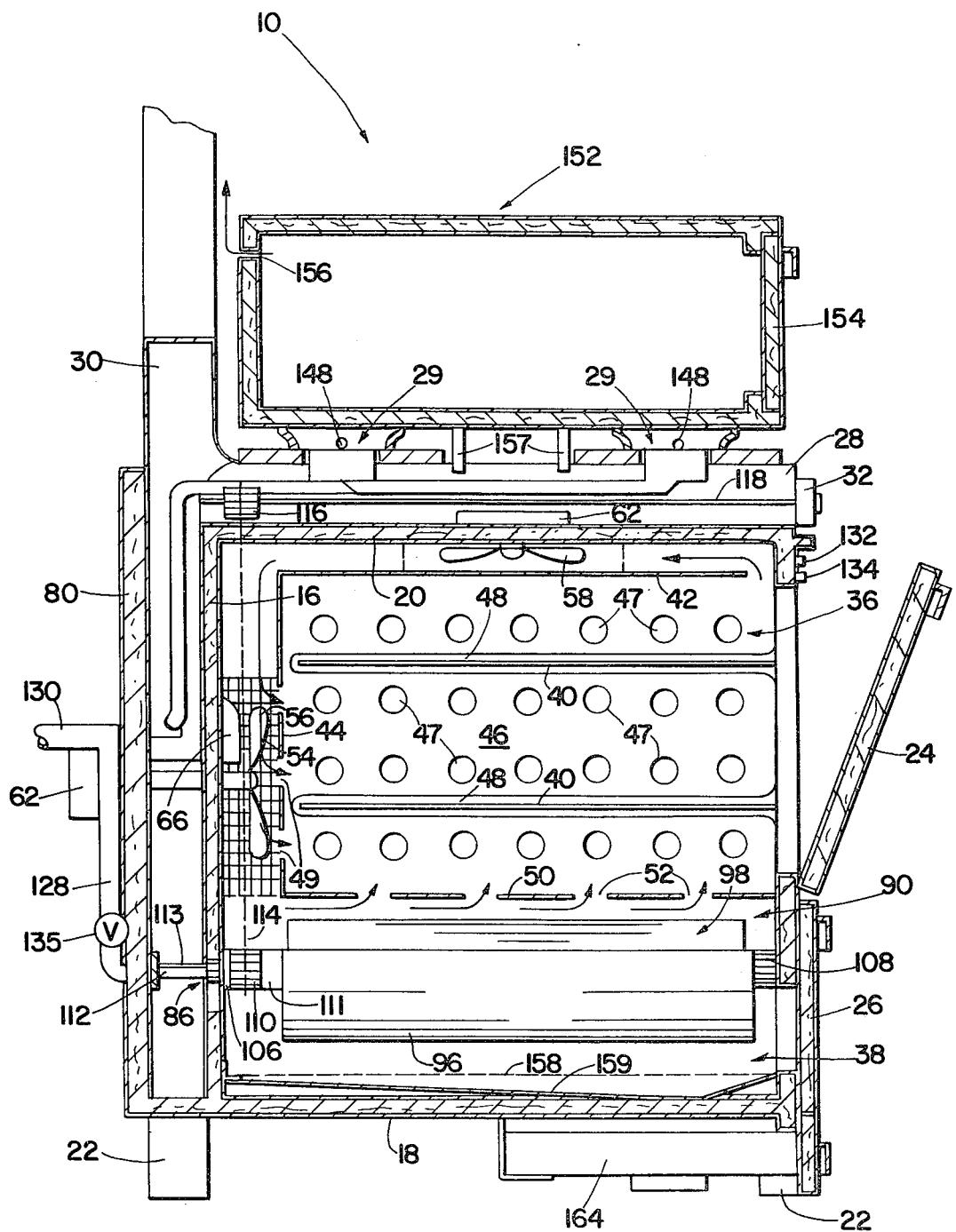
FIG. 3 is a cross-sectional view similar to FIG. 2 taken along a plane indicated by line 3—3 in FIG. 1.
Figure 4:
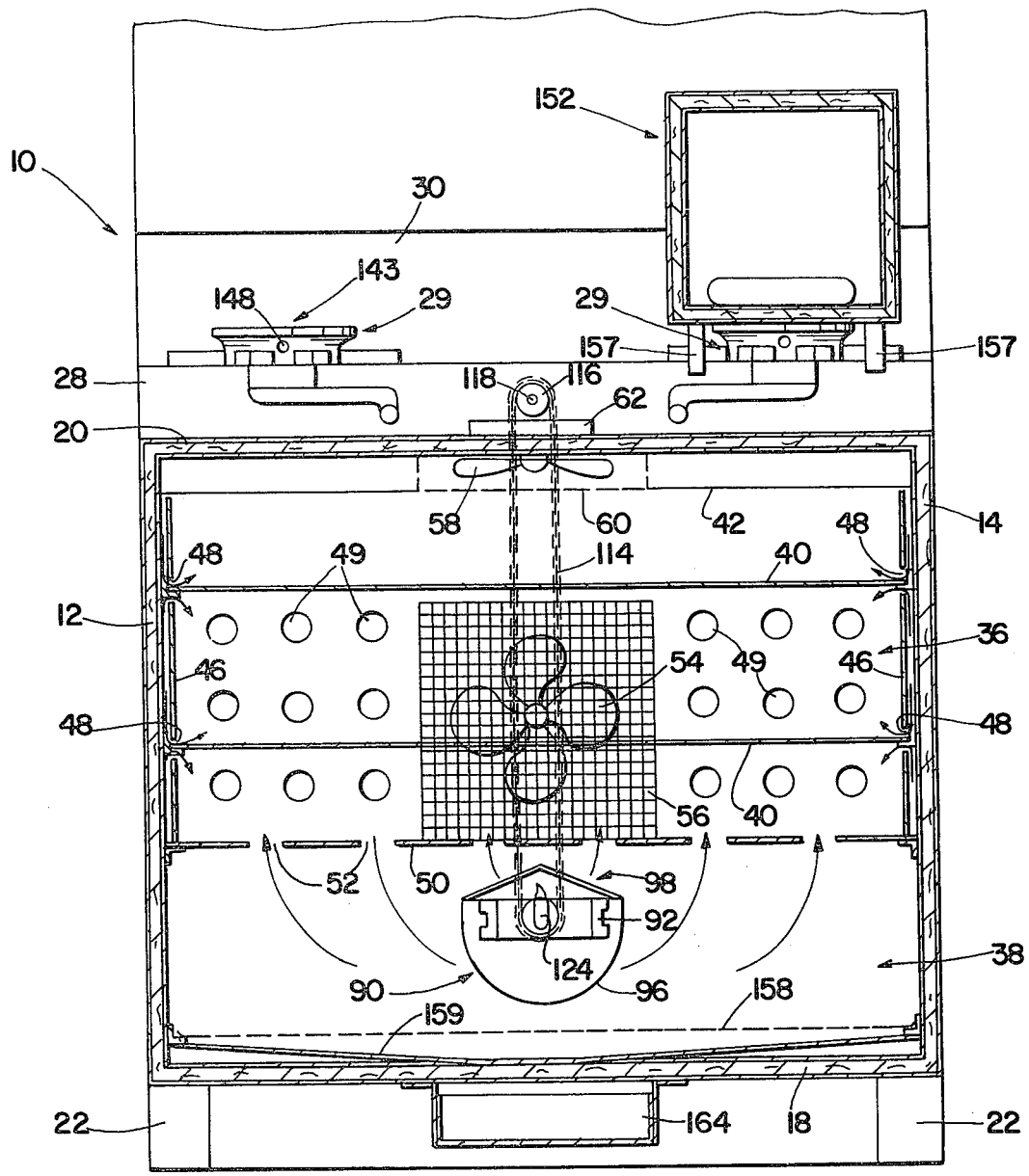
FIG. 4 is a sectional view of the range of FIG. 1 taken along a plane indicated by line 4—4 in FIG. 2.

Referring particularly to FIGS. 2–4, the range 10 includes an oven compartment 36 and a broiler compartment 38 situated vertically beneath the oven compartment 36. Access to the oven compartment 36 is controlled by the door 24, while access to the compartment 38 is controlled by the door 26. The oven compartment 36 includes spaced, horizontally disposed racks 40 upon which food containers can be supported. A hot air jacket includes an upper metal panel 42, a rear panel 44, and side panels 46. The panels 42, 44, 46 each are spaced a small distance from the walls 12, 14, 16 and 20 so that air may flow through the intermediate space as indicated in the various FIGURES by the arrows. The side panels 46 include a plurality of openings 47 located near the racks 40 so that heated air may be discharged near the racks 40 in order to heat food in the shortest possible time. The side panels 46 also include spaced, horizontally oriented slots 48 through which the racks 40 extend and which enable the racks 40 to be moved back and forth within the oven compartment 36. The rear panel 44 includes a plurality of openings 49 through which heated gases may be circulated near the racks 40. A lower panel 50 having a plurality of openings 52 defines the lowermost portion of the oven compartment 36. The openings 52 permit heated gases to be admitted into the oven compartment 36.

In order to improve the circulation of air throughout the oven compartment 36 and thereby improve its heating efficiency, a circulating air system is provided. A first fan 54 is located at the rear of the oven compartment 36. The fan 54 is located behind a grease-collecting screen 56 included as part of the rear panel 44. If desired, a second fan 58 may be provided to further improve air circulation within the oven compartment 36. The second fan 58 is located at the top of the oven compartment 36 and is located behind a grease-collecting screen 60 included as part of the upper panel 42. The fans 54, 58 are powered by electric motors indicated by the numerals 62.

Figure 9:
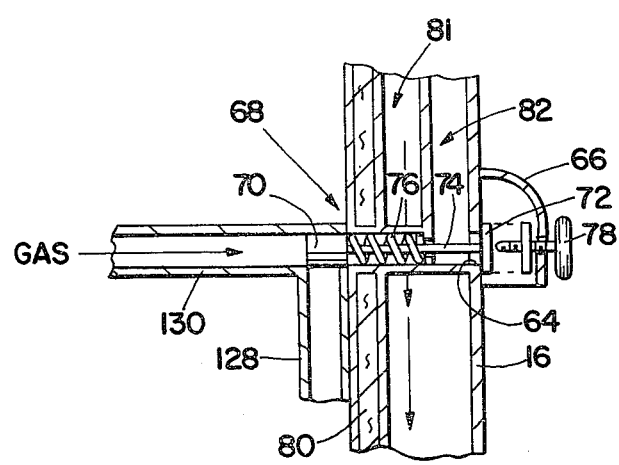
FIG. 9 is a view, partly in section, of a gas shutoff valve according to the invention, the valve being shown in a closed position.
Figure 10:
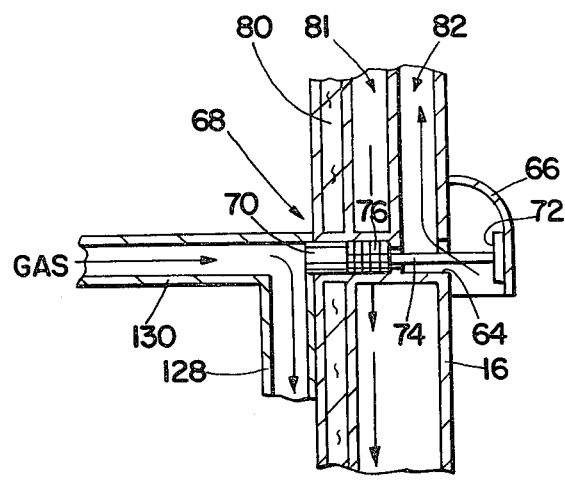
FIG. 10 is a view similar to FIG. 9 in which the shutoff valve is in an open position.

Referring also to FIGS. 9–10, the oven compartment 36 includes on its rear wall 16 a flue vent opening 64. The vent 64 is substantially surrounded with a hood 66 to cover almost all sides of the opening 64. The hood 66 restricts the free movement of heated gases through the flue opening 64 and thereby maintains the gases inside the oven compartment 36 for a longer period of time. Although the flue vent opening 64 and the hood 66 are illustrated in FIGS. 2 and 3 as being located approximately at the vertical midpoint of the rear wall 16, it will be appreciated that the opening 64 and the hood 66 may be located as desired within the oven compartment 36. Presumably, however, they will be included as part of the rear wall 16.

An important feature of the invention relates to restricting the free movement of heated gases through the flue opening 64 and thereby maintaining the gases inside the oven compartment 36 for a longer period of time. A gas-pressure-operated shutoff valve 68 is provided to close the flue vent opening 64 under appropriate circumstances. The valve 68 includes a piston 70, a stop member 72, a rod 74 rigidly interconnecting the piston 70 and the stop member 72, and a spring 76 interposed between the back face of the piston 70 and the wall 16. Referring particularly to FIG. 9, the hood 66 includes an opening through which a threaded key 78 extends. The key 78 may be threaded, if desired into an opening included as part of the stop member 72. The key 78 has been omitted from FIG. 10 for purposes of clarity. Operation of the gas shutoff valve 68 will be described subsequently.

An insulated wall 80 is spaced a small distance behind the rear wall 16. The wall 80 forms a portion of a vertically oriented duct 81 located approximately at the center of the range 10. A duct 82 smaller than the duct 81 is placed in the space intermediate the walls 16, 80 within the duct 81 and is in communication with the flue vent 64. An opening 84 for the duct 81 is provided near the upper end of the walls 16, 80. Intake air for the oven compartment 36 and the broiler compartment 38 is drawn in through the opening 84 and downwardly through the duct 81. Due to the discharge of flue gases through the opening 64, the duct 82 eventually will become heated. In turn, intake air for the compartments 36, 38 also will be heated. The preheated intake air is admitted to the compartments 36, 38 through an opening 86 formed near the bottom of the wall 16.

A burner element 90 is located near the interface between the oven compartment 36 and the boiler compartment 38. The element 90 includes components movable from a first position where heat is directed primarily toward the oven compartment 36 to a second position where heat is directed primarily toward the boiler compartment 38. Referring also to FIGS. 5 and 6, the burner element 90 includes a generally rectangular, stationary, gas-distributing manifold 92. The manifold 92 includes a plurality of openings 94 spaced equidistantly about its periphery. The burner element 90 includes a trough-like reflector 96. The reflector 96 is semi-cylindrical and is placed in proximity to the manifold 92. The burner element 90 also includes a flame diverter 98. The flame diverter 98 is an elongate structure having planar sides 100 meeting at an apex 102. The lower edges of the sides 100 include outwardly extending legs 104 which are secured to corner portions of the reflector 96. When the flame diverter 98 is secured to the reflector 96, the diverter 98 forms a tent-like structure for dispersing flames discharged from the openings 94.

The entire burner element 90 lies in a generally horizontal plane. The ends of the manifold 92 are carried by stub shafts 105, 106. The shaft 105 is located toward the front of the range 10 and carries a concentrically disposed bearing/spacer 108 which helps position the burner element 90 properly in place within the range 10. The bearing/spacer 108 also is secured to the reflector 96 for rotation therewith. The other shaft 106 includes a sprocket 110 and a bearing/spacer 111. The bearing/spacer 111 is concentrically disposed about the shaft 106 and is connected to the reflector 96 for rotation therewith. Gas inlet lines 112, 113 are concentrically disposed within the shaft 106. The line 112 supplies gas to the manifold 92.

A chain 114 is reeved about the spocket 110 and is reeved about another spocket 116 supported for rotation at the upper rear portion of the range 10. A shaft 118 extends the depth of the range 10 and is connected to the control knob 32. Upon rotation of the control knob 32, the shaft 118 will be rotated, the sprocket 110 will be rotated via the sprocket 116 and the chain 114, and the reflector 96 along with the flame diverter 98 will be rotated about a horizontal axis defined by the shafts 105, 106. The knob 32 also controls the temperature of the oven compartment 36. The relationship between the position of the various elements 32, 90, 110 and so forth and a conventional thermostatic temperature control system (not shown) is such that when the knob 32 is rotated to a position indicated as "broil," the reflector 96 and the diverter 98 will be rotated to a position where heat is directed primarily toward the broiler compartment 38. Under all other conditions of use, the reflector 96 and the diverter 98 will be in a position as indicated in the various FIGURES where heat will be directed primarily toward the oven compartment 36.

The gas supply system for the range 10 includes a two-stage piloted ignition 120 to ignite various burner elements such as the element 90. A first, very small pilot light 122 is burned continually to drive off moisture and to serve as an igniter for a second pilot light 124. The second pilot light 124 is larger than the first pilot light 122 and is connected to the first pilot light 122 by a flash tube 126. The second pilot light receives gas diverted from the supply line 112. The first pilot light receives gas from the supply line 113. When the burner element 90 is to be lighted, gas diverted to the second pilot light 124 will cause it to be ignited by the first pilot light 122. In turn, the now-ignited second pilot light 124 will ignite gas being discharged through the openings 94. Upon shutting off gas flow to the manifold 92, the second pilot light 124 will be extinguished. The first pilot light 122, however, will continue to burn because it is supplied by the separate gas supply line 113.

The supply line 112 receives gas from a conduit 128. The conduit 128 branches from a main gas supply line 130. The piston 70 is disposed at the juncture of the conduits 128, 130. In the position illustrated in FIG. 9, the piston 70 is advanced under the influence of the bias provided by the spring 76 to a closed position where gas is not permitted to flow into the conduit 128. In the closed position illustrated in FIG. 9, the stop member 72 completely covers the flue vent 64, thereby preventing the escape of heated gases from the compartments 36, 38. When the thermostatic temperature control system calls for more gas to be burned to increase or maintain the temperature in the compartments 36, 38, gas pressure in the conduit 130 is increased. Eventually, the gas pressure increases to the point where the piston 70 is advanced to an open position against the spring bias as illustrated in FIG. 10. Under these circumstances, gas enters the conduit 128 and is directed to the burner element 90 where combustion occurs. Further, while combustion is occuring, the stop member 72 will be moved to a position away from the flue vent 64, thereby permitting heated gases to escape from the compartment 36. Upon the attainment of a desired temperature, gas pressure within the conduit 130 will be decreased, thereby permitting the piston 70 once again to be advanced to a closed position under the influence of the spring bias. The stop member 72 will once again cover the flue vent opening 64 and prevent the escape of heated gases through the flue vent opening 64. The threaded key 78 is provided as an optional measure in the event it is desired to operate the range 10 without benefit of the shutoff valve 68. Such a circumstance might occur should the valve 68 become stuck in a closed or almost-closed position. This is possible, although unlikely, because the valve 68 is a failsafe valve in that the spring 76 always tends to bias the piston 70 to a closed position. Use of the key 78 would permit the compartments 36, 38 to be utilized, albeit at reduced efficiency.

A safety feature is provided by two switches 132, 134 controlled by the oven door 24. The switch 132 is an override switch connected to the motors 62. Upon opening the door 24, the motors 62 will be shut down, thereby halting operation of the fans 54, 58. This will tend to minimize heat loss during those times the door 24 is opened. The switch 134 is connected to a solenoid-operated shutoff valve 135 disposed in the gas supply line 128 supplying gas to the burner element 90. When the door 24 is opened, the flow of gas through the burner element 90 will be halted, again limiting the amount of heat loss during open-door conditions.

Figure 11:
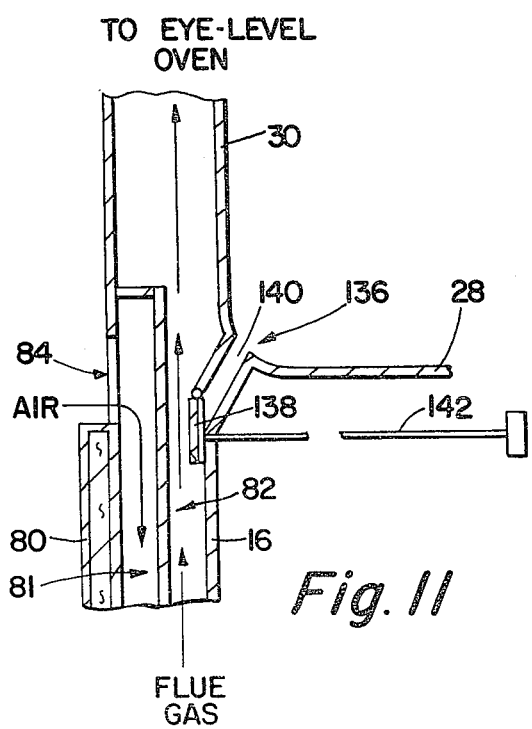
FIG. 11 is a view of an adjustable selector plate for providing further control of the discharge of flue gases, the plate being shown in a first position; and, FIG. 12 is a view similar to FIG. 11 in which the selector plate is shown in a second position.
Figure 12:
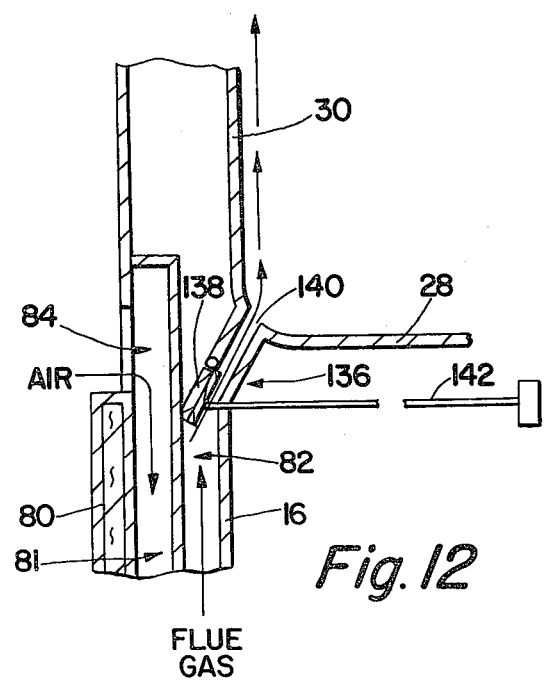

Referring particularly to FIGS. 11 and 12, heated gases discharged through the flue vent 64 are directed upwardly through the duct 82. A diverter valve 136 is provided to further control the discharge of the heated gases. The valve 136 includes a pivotally mounted plate 138, an opening 140 directed upwardly through the burner-supporting structure 28 for communication with the atmosphere, and a control handle 142 connected to the plate 138. Upon pulling the handle 142 outwardly, the plate 138 is pivoted to a position blocking the opening 140. In this circumstance, gases flow past the plate 138 and upwardly into a portion of the rear panel 30. The gases thus directed into the rear panel 30 can be conducted to the eye-level oven 33 for assisting in heating the oven 33. When the handle 142 is pushed inwardly, the plate 138 is pivoted clockwise to the position shown in FIG. 12. In this circumstance, the opening 140 is uncovered and flue gases are discharged directly to the atmosphere in front of the rear panel 30.

Referring particularly to FIGS. 7 and 8, flame-containing range-top burner rings 143 are shown. The burner rings 143 essentially are annular wall members 144 configured on their lower surface so as to make a substantially fluid-tight seal with the upper surface of reflectors 145 positioned adjacent the burner elements 29. In FIG. 7, a conventional pan-supporting grid 146 is shown. The wall member 144 includes a plurality of vertically oriented slots 145 about its lower periphery. The slots 146 enable the ring 143 to be tightly fitted over the grid 146 and against the reflector 145. The wall member 144 also includes a plurality of openings 148 for the admission of combustion air. The upper surface of the ring 143 is flared outwardly as indicated at 150. Pots and pans may be placed atop the flared upper portion 150 and a substantial surface-to-surface contact between the pots and pans and the ring 143 will be created. In turn, flames emitted by the range-top burner elements 29 will be contained and heat emitted by the burner elements 29 will be conserved.

A small, portable oven 152 may be employed with the range 10, if desired. The oven 152 is a box-like structure having a front door 154 for loading and unloading the oven 152. The oven 152 includes a vent opening 156 located at the rear of the oven 152. The oven 152 is adapted to be placed directly atop two of the burner rings 143 and located in place there by pegs 157 extending into openings formed in the upper surface of the range 10. When it is desired to cook only a small amount of food, the oven 152 can be used so as to avoid the need for heating the larger compartments 36, 38. The oven 152 is small enough that it can be stored compactly with pots and pans and other cooking appliances.

The range 10 also includes a drip pan system to minimize the production of smoke and odors resulting from the removal of liquids extracted from food during the cooking process. A perforated food-supporting rack 158 is included as part of the broiler compartment 38 to support food for cooking immediately adjacent the burner element 90. An inclined surface 159 is located beneath the rack 158 and defines the lowermost portion of the broiler compartment 38. An opening 160 is located at the lowest point of the inclined surface 159. The opening 160 is defined by a funnel-like cylindrical extension 162 which is fitted within an opening formed in the lower wall 18. A tray 164 is positioned beneath the opening 162. Because the tray 164 is located away from the broiler compartment 38, it will be maintained at or near room temperature. Accordingly, liquids coming into contact with the inclined surface 159 will drain through the opening 160 into the tray 164 and will not have time to be burned. Because the liquids are collected in the relatively low-temperature tray 164, smoke and odors are substantially eliminated.

It will be appreciated that the range 10 according to the invention is exceedingly energy-efficient. The hot air jacket and the circulating air system provide excellent uniformity of temperature within the oven compartment 36 to assist in cooking food properly and rapidly. The air preheating system improves thermal efficiency, and the gas shutoff valave 68 further improves efficiency. The flue gas diverter valve 136 permits heated exhaust gases to be used in the eye-level oven 33, resulting in additional conservation of energy. The range-top burner rings 143 markedly increase the efficiency of cooking atop the range 10, as does the portable oven 152. Further, the drip pan 164 greatly minimizes the production of smoke and odors which otherwise would occur during a cooking operation.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. Further, although the invention has been described in the environment of a gas cooking range, it will be appreciated that various aspects of the invention can be applied to electric cooking ranges and other appliances substantially without modification. It is intended that the patent shall cover, by suitable expression in the appended claims, whatever features of patentable novelty exist in the invention disclosed.

What is claimed is:

1. In a gas cooking range, the combination comprising:
    (a) an oven compartment;
    (b) a broiler compartment located beneath the oven compartment;
    (c) a burner element located near the interface between the oven compartment and the broiler compartment, the burner element movable from a first position where heat is directed primarily toward the oven compartment to a second position where heat is directed primarily toward the broiler compartment; and
    (d) means for moving the burner element between the first and second positions.

2. The gas cooking range of claim 1, wherein the burner element lies in a generally horizontal plane and the burner element is rotatable about a longitudinal axis between the first and second positions.

3. The gas cooking range of claim 2, wherein the burner element is journaled for rotation on stub shafts, the means for moving the burner element including a gearing arrangement accessible to the operator of the range from a location external of the range.

4. The gas cooking range of claim 1, wherein the burner element includes:
    (a) a generally horizontally disposed, stationary, gas-distributing manifold;
    (b) a reflector positioned adjacent the manifold and located on one side of the manifold; and
    (c) a flame diverter positioned adjacent the manifold on that side of the manifold opposite the reflector, the reflector and the diverter being connected to each other and rotatable between the first and second positions.

5. In a cooking range, the combination comprising:
    (a) an oven having a flue vent for the discharge of heated gases from the oven;
    (b) a heating means for the oven, the heating means being in the form of a gas burner;
    (c) a closure member for the flue vent, the closure member movable from a first position where heated gases are permitted to be discharged from the oven and a second position where heated gases are retained within the oven;
    (d) a control for the heating means, the control being disposed in a gas line supplying the heating means and permitting the heating means to be selectively activated, the control being operated by gas pressure in the gas line; and,
    (e) an interconnected between the flue vent closure member and the heating means control, the interconnection causing the closure member to move to the first position when the heating means is heating the oven, and causing the closure member to move to the second position when the heating means is not heating the oven.

6. The cooking range of claim 5, wherein the control for the heating means always is biased to a non-heating position.

7. The cooking range of claim 5, wherein the heating means is in the form of a gas-burning manifold and the control for the heating means is in the form of a valve disposed in the gas supply line.

8. The cooking range of claim 7, wherein the closure member is in the form of a disc-like cover, and the interconnection between the closure member and the heating means control is in the form of a rod.

9. The cooking appliance of claim 8, wherein a spring interposed between the valve and a stationary member always biases the valve to a gas shutoff position.

10. In a gas cooking range, a means to constrain and direct the flame emitted by range-top burners, comprising an upstanding ring adapted to be disposed circumferentially about a given burner, the ring including vertically extending slots to enable the ring to be fitted about a grid-like pan support having radially extending members, the ring including at least one vent opening for the entrance of air for combustion, and a laterally outwardly extending flange located at the upper periphery of the ring, the flange adapted to maintain generally surface-to-surface contact with the underside of a pan.

11. In a cooking range having a waist-level oven and an eye-level oven, the combination comprising:
 (a) a flue vent for the discharge of heated gases from the waist-level oven;
 (b) a first passage in communication with the flue vent for conducting heated gases from the flue vent to the atmosphere;
 (c) a second passage in communication with the flue vent for conducting heated gases from the flue vent to the eye-level oven; and,
 (d) a diverter valve for controlling the discharge of gases either to the atmosphere or to the eye-level oven.

12. The cooking range of claim 11, wherein the diverter valve includes a pivotally mounted plate and a handle connected to the plate, the handle being accessible to the user of the range at a location near the top of the waist-level oven.

13. In a gas cooking range, the combination comprising:
 (a) an oven compartment;
 (b) a broiler compartment located beneath the oven compartment;
 (c) a burner element located near the interface between the oven compartment and the broiler compartment, the burner element including components movable from a first position where heat is directed primarily toward the oven compartment to a second position where heat is directed primarily toward the broiler compartment;
 (d) a flue vent for the discharge of heated gases from the oven compartment;
 (e) a closure member for the flue vent, the closure member movable from a first position where heated gases are permitted to be discharged from the oven and a second position where heated gases are retained within the oven;
 (f) a control for the burner element, the control permitting the burner element to be selectively activated;
 (g) an interconnection between the flue vent closure member and the burner element control, the interconnection causing the closure member to move to the first position when the burner element is heating the oven, and causing the closure member to move to the second position when the burner element is not heating the oven;
 (h) a first passage in communication with the flue vent to convey heated gases away from the oven;
 (i) a second passage for the intake of air into the oven;
 (j) the first and second passages being located in heat exchange relationship with each other so that intake air for the oven is preheated;
 (k) a plurality of panels disposed within the oven, the panels forming an enclosure spaced a small distance from the sides of the oven, the panels providing an area of relatively poor heat conductivity between the panels and the oven walls and an area of relatively uniform temperature distribution within the enclosure; and,
 (l) a fan disposed inside the oven for circulating heated gas within the oven.

14. The gas cooking range of claim 13, further comprising means to constrain and direct the flame emitted by range-top burners, including an upstanding ring adapted to be disposed circumferentially about a given burner, the ring including vertically extending slots to enable the ring to be fitted about a grid-like pan support having radially extending members, the ring including at least one vent opening for the entrance of air for combustion, and a latterally outwardly extending flange located at the upper periphery of the ring, the flange adapted to maintain generally surface-to-surface contact with the underside of a pan.

15. The gas cooking range of claim 13, further comprising a portable oven for use with the range, comprising a box-like enclosure adapted to be placed atop at least one surface burner, the enclosure having a selectively openable door and a flue vent for the discharge of heated gases from the interior of the oven.

16. The gas cooking range of claim 13, further comprising:
 (a) a perforated food holder upon which food is supported for cooking;
 (b) a first drip pan disposed beneath the food holder and upon which liquids may drip during the cooking process; and
 (c) a second drip pan disposed beneath the first drip pan and into which liquids from the first drip pan may drip during the cooking process, the second drip pan being maintained at or near room temperature throughout the cooking process.

17. The gas cooking range of claim 13, further comprising:
 (a) an eye-level oven;
 (b) the first passage being in communication with the atmosphere;
 (c) a third passage in communication with the flue vent for conducting heated gases from the flue vent to the eye-level oven; and
 (d) a diverter valve for controlling the discharge of gases either to the atmosphere or to the eye-level oven through either the first passage or the third passage.

18. The gas cooking range of claim 13, further comprising:
 (a) a first, small, continuously operated pilot light; and,
 (b) a second, large, intermittently operated pilot light, disposed adjacent the burner element and the first pilot lights, the second pilot light serving to ignite the burner element after being ignited by the first pilot light.

* * * * *